United States Patent
Lindores

(10) Patent No.: US 9,491,914 B2
(45) Date of Patent: *Nov. 15, 2016

(54) MOISTURE SENSING WATERING SYSTEM

(71) Applicant: Trimble Navigation Limited, Sunnyvale, CA (US)

(72) Inventor: Robert James Lindores, Christchurch (NZ)

(73) Assignee: Trimble Navigation Limited, Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/722,734

(22) Filed: May 27, 2015

(65) Prior Publication Data

US 2015/0250112 A1    Sep. 10, 2015

Related U.S. Application Data

(63) Continuation of application No. 13/770,292, filed on Feb. 19, 2013, now Pat. No. 9,060,473.

(51) Int. Cl.
*A01G 25/09* (2006.01)
*A01G 25/16* (2006.01)

(52) U.S. Cl.
CPC ........... *A01G 25/167* (2013.01); *A01G 25/092* (2013.01); *Y10T 137/189* (2015.04)

(58) Field of Classification Search
CPC .............. A01G 25/092; A01G 25/167; Y10T 137/1866; Y10T 137/189
See application file for complete search history.

(56) References Cited

U.S. PATENT DOCUMENTS

| | | |
|---|---|---|
| 3,902,668 A | 9/1975 | Daugherty |
| 4,099,669 A | 7/1978 | Cortopassi |
| 4,226,366 A | 10/1980 | Nortoft |
| 4,396,149 A | 8/1983 | Hirsch |
| 4,662,563 A | 5/1987 | Wolfe |
| 4,884,224 A | 11/1989 | Hirosawa |
| 5,884,224 A * | 3/1999 | McNabb ................. A01G 7/00 700/284 |
| 6,290,151 B1 | 9/2001 | Barker et al. |

(Continued)

FOREIGN PATENT DOCUMENTS

WO        87/00725        2/1987

OTHER PUBLICATIONS

"PCT/US2014/016959 International Search Report and Written Opinion", 10 pages.

*Primary Examiner* — Mary McManmon
*Assistant Examiner* — David Colon Morales
(74) *Attorney, Agent, or Firm* — Kilpatrick Townsend & Stockton LLP

(57) ABSTRACT

A moisture sensing watering system comprising a central pivot, a water conveyance system, a plurality of wheels, a first at least one moisture sensor coupled with a first wheel, a second at least one moisture sensor coupled with a second wheel, a moisture information converter, and a moisture content provider. The first moisture sensor pierces the ground during each rotation of the first wheel and performs a first moisture sensing as a part of the piercing of the ground. The second moisture sensor pierces the ground during each rotation of the second wheel and performs a second moisture sensing as a part of the second moisture sensor piercing the ground. The moisture information converter receives the moisture sensing information and converts the moisture sensing information into a signal. The moisture content provider provides the signal in a user accessible format.

25 Claims, 6 Drawing Sheets

(56) References Cited

U.S. PATENT DOCUMENTS

| | | | |
|---|---|---|---|
| 6,337,971 B1 | 1/2002 | Abts | |
| 6,377,058 B1 * | 4/2002 | Pemrick | A01F 15/08 324/694 |
| 6,401,742 B1 * | 6/2002 | Cramer | A01G 25/167 137/78.3 |
| 6,975,245 B1 * | 12/2005 | Slater | A01G 25/167 239/63 |
| 7,953,550 B1 * | 5/2011 | Weiting | A01G 25/092 239/727 |
| 8,024,074 B2 * | 9/2011 | Stelford | A01G 25/092 137/78.2 |
| 8,442,722 B2 * | 5/2013 | Grabow | A01G 25/092 701/41 |
| 9,060,473 B2 * | 6/2015 | Lindores | A01G 25/092 |
| 2002/0100814 A1 | 8/2002 | Pollak et al. | |
| 2002/0134868 A1 | 9/2002 | Hansen | |
| 2006/0144437 A1 | 7/2006 | Dresselhaus et al. | |
| 2008/0046130 A1 * | 2/2008 | Faivre | A01G 25/092 700/284 |
| 2009/0025578 A1 * | 1/2009 | Roberts | A01F 15/08 100/102 |
| 2010/0032493 A1 * | 2/2010 | Abts | A01G 25/092 239/11 |
| 2011/0153161 A1 | 6/2011 | Grabow et al. | |
| 2012/0010782 A1 * | 1/2012 | Grabow | G01S 19/14 701/41 |

\* cited by examiner

MOISTURE SENSING WATERING SYSTEM

CROSS-REFERENCE TO RELATED APPLICATION

This application is a continuation application of and claims the benefit of co-pending U.S. patent application Ser. No. 13/770,292 filed on Feb. 19, 2013 entitled "Moisture Sensing Water System" by Lindores, R., having Attorney Docket No. TRMB-3022, and assigned to the assignee of the present application.

BACKGROUND

Irrigation methods are utilized by farmers to provide water to the crops in their fields. There are a number of different irrigation methods; however, the intended result is to maintain a field with the proper amount of water necessary for crop growth. Under-watering and over-watering can have significant impact on crop yield.

BRIEF DESCRIPTION OF THE DRAWINGS

The accompanying drawings, which are incorporated in and form a part of this application, illustrate and serve to explain the principles of embodiments in conjunction with the description. Unless noted, the drawings referred to this description should be understood as not being drawn to scale.

DESCRIPTION OF EMBODIMENT(S)

Reference will now be made in detail to various embodiments of the present technology, examples of which are illustrated in the accompanying drawings. While the present technology will be described in conjunction with these embodiments, it will be understood that they are not intended to limit the present technology to these embodiments. On the contrary, the present technology is intended to cover alternatives, modifications and equivalents, which may be included within the spirit and scope of the present technology as defined by the appended claims. Furthermore, in the following description of the present technology, numerous specific details are set forth in order to provide a thorough understanding of the present technology. In other instances, well-known methods, procedures, components, and circuits have not been described in detail as not to unnecessarily obscure aspects of the present technology.

Unless specifically stated otherwise as apparent from the following discussions, it is appreciated that throughout the present description of embodiments, discussions utilizing terms such as "receiving", "storing", "generating", "transmitting", "inferring," or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. Embodiments of the present technology are also well suited to the use of other computer systems such as, for example, mobile communication devices.

Figure 1:
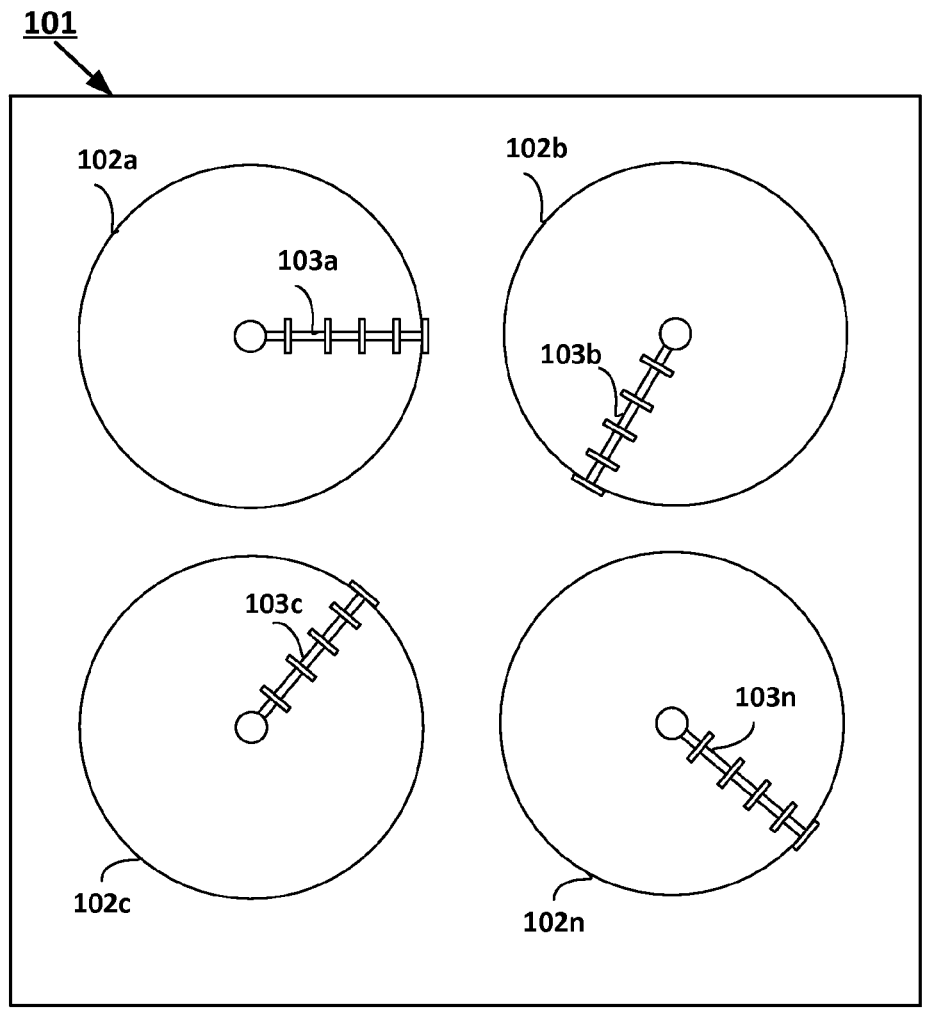
FIG. 1 is a diagram of an irrigated field with a plurality of watering wheel irrigators thereon according to one embodiment of the present technology.

With reference now to FIG. 1, a diagram of an irrigated field 101 with a plurality of watering wheel irrigators 103a-103n thereon is shown according to one embodiment of the present technology. In general, watering wheel irrigators 103a-103n are used within field 101 to irrigate a circular area such as circular areas 102a-102n. Although 4 watering wheel irrigators 103 are shown in field 101, it should be appreciated that a field 101 may consist of more or fewer watering wheel irrigators. The use of 4 watering wheel irrigators herein is merely for purposes of clarity. Moreover, it should also be appreciated that a field 101 does not have to be rectangular but may be of any shape. For example, in one embodiment circular area 102 may be a field 101.

Figure 2:
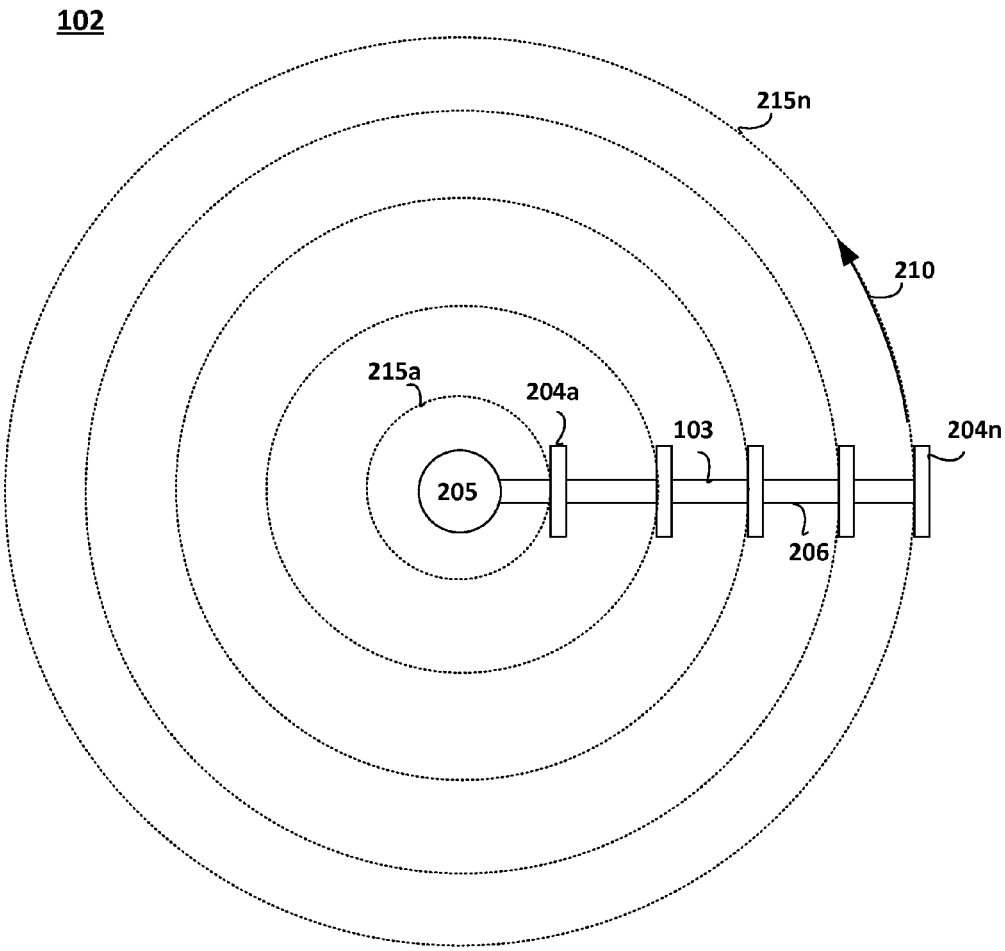
FIG. 2 is a top view diagram of a field with a single watering wheel irrigator thereon according to one embodiment of the present technology.

Referring now to FIG. 2, a top view diagram of a field 102 with a single watering wheel irrigator 103 thereon is shown according to one embodiment of the present technology. In one embodiment, watering wheel irrigator 103, includes a pivot 205, a water conveyance 206, such as a tube, gutter, hose or the like, and wheels 204a-204n to support the water conveyance 206. FIG. 2 additionally shows the direction of travel 210 of watering wheel irrigator 103 as well as the wheel paths 215a-215n as watering wheel irrigator 103 travels around the circular area 102.

Figure 3:
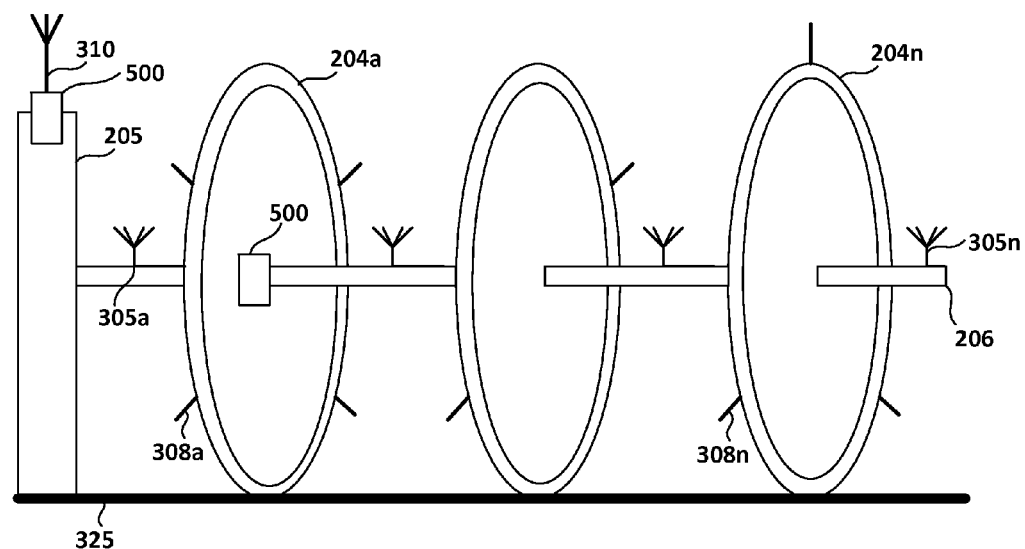
FIG. 3 is a side view diagram of a watering wheel irrigator according to one embodiment of the present technology.

With reference now to FIG. 3, a side view diagram of a watering wheel irrigator 103 is shown according to one embodiment of the present technology. In one embodiment, watering wheel irrigator 103 includes pivot 205, water conveyance 206, and wheels 204a-n as shown in FIG. 2. In addition to the features from FIG. 2, the side view of watering wheel irrigator 103 illustrates a nozzle system 305a-305n for spraying the field. In general, watering wheel irrigator 103 can be of different lengths and sizes. For example, if it were used in a yard, watering wheel irrigator 103 may be 5-30 feet long. Conversely, in a large field 101, watering wheel irrigator 103 may be 100-600 feet long. Although a number of sizes are described, the actual size of watering wheel irrigator 103 may be outside of the stated ranges in either direction. The watering wheel irrigator 103 lengths herein are merely provided for clarity.

In one embodiment, watering wheel irrigator 103 also includes an antenna 310 and a plurality of moisture sensing probes 308a-308n. As can be seen from the illustration, each wheel 204 may have none or any number of moisture sensing probes 308 affixed to the wheel 204. For example, wheel 204 closest to pivot 205 is shown with 4 moisture sensing probes 308, while the second wheel 204 has 2 moisture sensing probes 308 and the third wheel is shown with 3 moisture sensing probes 308. In another example, the moisture sensing probes 308 may be placed only on every other wheel, every third wheel, or the like.

Figure 4:
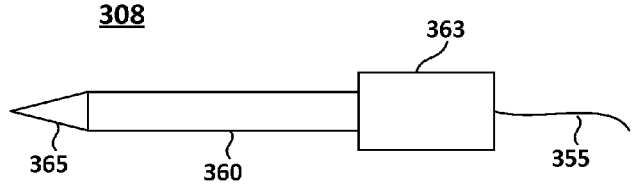
FIG. 4 is a diagram of a moisture sensor according to one embodiment of the present technology.

Referring now to FIG. 4, a diagram of a moisture sensing probe 308 is shown according to one embodiment of the present technology. In one embodiment, moisture sensing probe 308 includes a tip 365, a body 360, a converter 363 and a data path 355.

In one embodiment, moisture sensing probe 308 has a water sensor 365 near the distal end. In addition, in one embodiment, body 360 can be adjusted or built to different lengths depending upon the depth at which the moisture measurements are desired. For example, a shorter body 360 will provide a measurement closer to the ground 325 surface while a longer body 360 will provide a deeper soil moisture content measurement.

Converter 363 is utilized to convert the moisture content measurement from the water sensor 365 to an electronic signal indicative of the moisture content of the soil. The electronic signal can then be transmitted over data path 355. In general, data path 355 may be wired or wireless.

Figure 5:
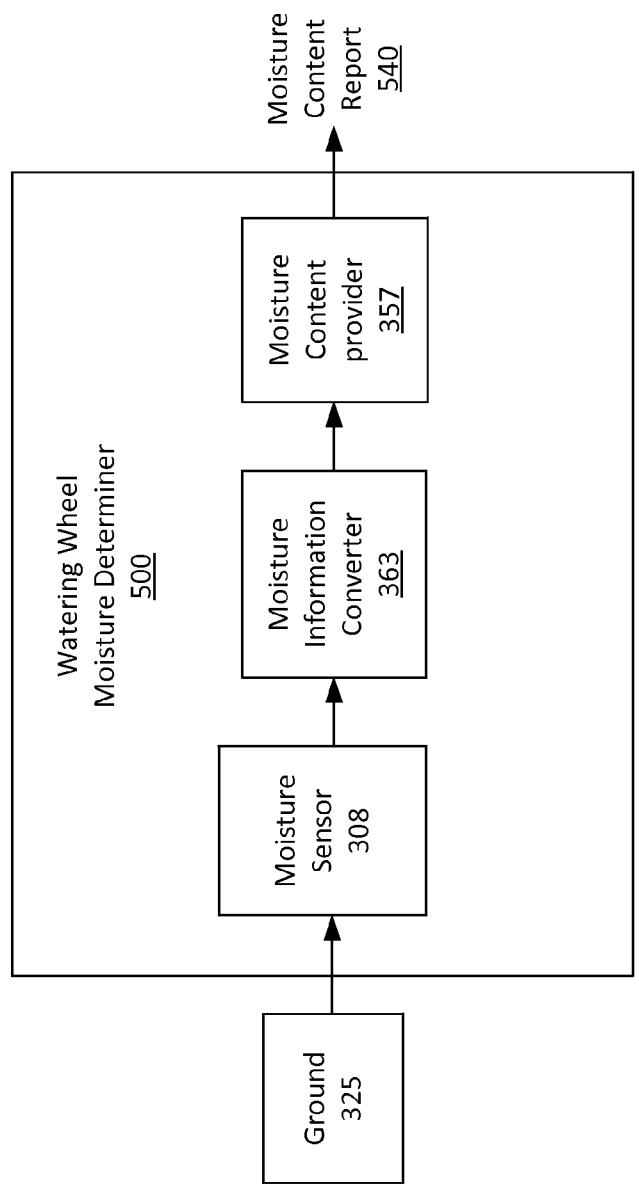
FIG. 5 is a block diagram of a watering wheel moisture determining system according to one embodiment of the present technology.

With reference now to FIG. 5, a block diagram of a watering wheel moisture determiner 500 is shown according to one embodiment of the present technology. In general, watering wheel moisture determiner 500 measures the moisture content of the ground 325 and provides moisture content report 540 in a user accessible format.

Referring still to FIG. 5, watering wheel moisture determiner 500 includes at least one moisture sensor 308 coupled with at least one wheel 204 coupled with a water conveyance system 206, the at least one moisture sensor 308 to pierce the ground during each rotation of the at least one wheel and perform a moisture sensing.

In one embodiment, watering wheel moisture determiner 500 also includes a moisture content converter 363 to receive the moisture sensing information and convert the moisture sensing information into a signal indicative of the moisture content of the ground 325.

Watering wheel moisture determiner 500 includes a moisture content provider 357. In one embodiment, moisture content provider transmits the signal indicative of the moisture content of the ground 325 in a user accessible format such as, moisture content report 540. In one embodiment, the moisture content provider 357 is located at the at least one wheel 204; However, in another embodiment, the moisture content provider 357 is located at the central pivot 205. For example, moisture content provider 357 may include a transmitter to transmit the data wired or wirelessly.

Figure 6:
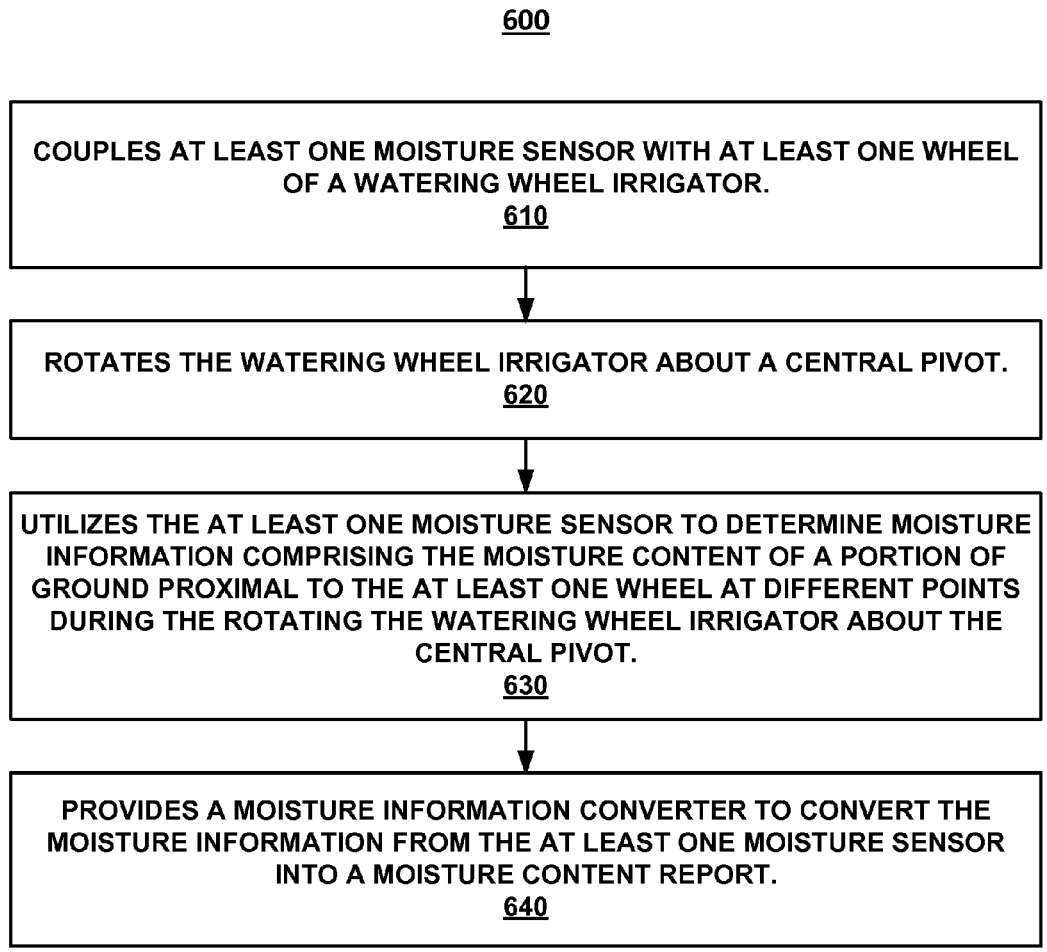
FIG. 6 is a flowchart of a method for utilizing the watering wheel moisture determining system to monitor moisture content according to one embodiment of the present technology.

Referring now to FIG. 6, a flowchart 600 of a method for determining ground moisture is shown according to one embodiment of the present technology.

With reference now to 610 of FIG. 6 and FIG. 3, one embodiment couples at least one moisture sensor 308 with at least one wheel 204 of a watering wheel irrigator 103. As stated herein, each wheel 204 may have none or any number of moisture sensing probes 308 affixed to the wheel 204. For example, wheel 204 closest to pivot 205 is shown with 4 moisture sensing probes 308, while the second wheel 204 has 2 moisture sensing probes 308 and the third wheel is shown with 3 moisture sensing probes 308. In another example, the moisture sensing probes 308 may be placed only on every other wheel, every third wheel, or the like.

With reference now to 620 of FIG. 6 and FIG. 2, one embodiment rotates the watering wheel irrigator 103 about a central pivot 205.

With reference now to 630 of FIG. 6 and FIG. 3, one embodiment utilizes the at least one moisture sensor 308 to determine moisture information comprising the moisture content of a portion of ground 325 proximal to the at least one wheel 308 at different points during the rotating 210 of the watering wheel irrigator 103 about the central pivot 205.

In one embodiment, the moisture sensing probes 308 are affixed to the wheel 204 and punch into the ground 325 as watering wheel irrigator 103 rotates about pivot 205 through the field 102.

With reference now to 640 of FIG. 6 and FIG. 5, one embodiment provides a moisture information converter 363 to convert the moisture information from the at least one moisture sensor 308 into a moisture content report 540. In one embodiment, the moisture information is collected from each moisture sensor 308 at a moisture information converter 363 coupled to the moisture sensor 308.

In another embodiment, the moisture information is collected from one or more moisture sensors 308 at a central moisture sensor data collection location. For example, each moisture sensor 308 may be wired or wirelessly coupled with a central moisture information converter 363. The central moisture information converter 363 may be located at the wheel 204 or at another location on the watering wheel irrigator 103.

In one embodiment, a transmitter/receiver 310 located at the central pivot 205 is used for transmitting the moisture content report 540. However, in another embodiment, a transmitter may be incorporated at different locations on the watering wheel irrigator 103, such as at wheel 204 for transmitting the moisture content report.

In one embodiment, moisture content report 540 is used as stand-alone information. For example, the moisture content report 540 may provide information about over-watering or under-watering situations for a particular field. However, moisture content report 540 may be mined down for further specific information. For example, if more than one wheel 204a-204n has a moisture sensing probe 308, the information from moisture content report 540 could be used to determine different moisture issues within the circular area 102. In other words, if one or more sprinklers 305 were clogged or miss-operating, moisture content report 540 may show that the ground is well-watered except for the area around wheel 204a. If the area around 204a was shown as being overwatered, a leak or the like may be occurring. Similarly, if the ground around 204a was shown as being under-watered, sprinkler 305a may be clogged, broken, or the like.

In another embodiment, moisture content report 540 may be used by a larger field management system. For example, moisture content report 540 may be added to a database of information that can be used to develop watering plans and schedules to meet the needs of the crops, as defined by agronomists, or the farmer. In another example, moisture content report 540 may be used to estimate watering needs based on crop, field parameters, time of year, weather, desired water content for the soil, and the like. Additionally, the larger field management system may use moisture content report 540 to provide manual adjustment recommendations or even perform automatic adjustments to the watering wheel irrigator 103.

For example, after receiving the moisture content report 540, the field management system may modify how long the watering wheel irrigator 103 is on for at a given flow rate, if the flow rate can be adjusted, and the like. In other words, in one embodiment, the signal is used to automatically control the amount of water disseminated by the moisture sensing watering system.

Computer System

Figure 7:
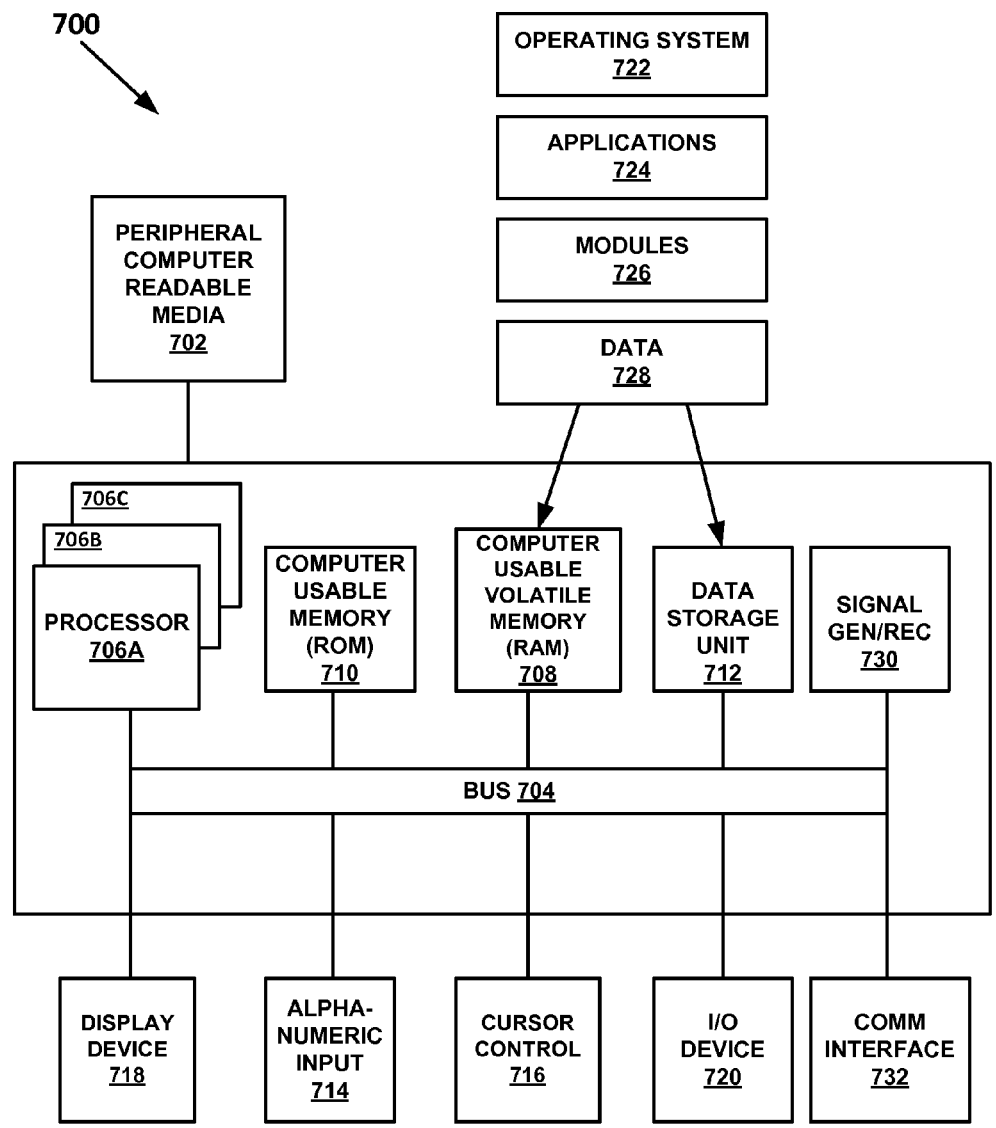
FIG. 7 is a block diagram of an example computer system upon which embodiments of the present technology may be implemented.

With reference now to FIG. 7, portions of the technology for providing a communication composed of computer-readable and computer-executable instructions that reside, for example, in non-transitory computer-usable storage media of a computer system. That is, FIG. 7 illustrates one example of a type of computer that can be used to implement embodiments of the present technology. FIG. 7 represents a system or components that may be used in conjunction with aspects of the present technology.

FIG. 7 illustrates an example computer system 700 used in accordance with embodiments of the present technology. It is appreciated that system 700 of FIG. 7 is an example only and that the present technology can operate on or within a number of different computer systems including general purpose networked computer systems, embedded computer systems, routers, switches, server devices, user devices, various intermediate devices/artifacts, stand-alone computer systems, mobile phones, personal data assistants, televisions and the like. As shown in FIG. 7, computer system 700 of FIG. 7 is well adapted to having peripheral computer readable media 702 such as, for example, a floppy disk, a compact disc, and the like coupled thereto.

System 700 of FIG. 7 includes an address/data bus 704 for communicating information, and a processor 706A coupled to bus 704 for processing information and instructions. As depicted in FIG. 7, system 700 is also well suited to a multi-processor environment in which a plurality of processors 706A, 706B, and 706C are present. Conversely, system 700 is also well suited to having a single processor such as, for example, processor 706A. Processors 706A, 706B, and 706C may be any of various types of microprocessors. System 700 also includes data storage features such as a computer usable volatile memory 708, e.g. random access memory (RAM), coupled to bus 704 for storing information and instructions for processors 706A, 706B, and 706C.

System 700 also includes computer usable non-volatile memory 710, e.g. read only memory (ROM), coupled to bus 704 for storing static information and instructions for processors 706A, 706B, and 706C. Also present in system 700 is a data storage unit 712 (e.g., a magnetic or optical disk and disk drive) coupled to bus 704 for storing information and instructions. System 700 also includes an optional alpha-numeric input device 714 including alphanumeric and function keys coupled to bus 704 for communicating information and command selections to processor 706A or processors 706A, 706B, and 706C. System 700 also includes an optional cursor control device 716 coupled to bus 704 for communicating user input information and command selections to processor 706A or processors 706A, 706B, and 706C. System 700 of the present embodiment also includes an optional display device 718 coupled to bus 704 for displaying information.

Referring still to FIG. 7, optional display device 718 of FIG. 7 may be a liquid crystal device, cathode ray tube, plasma display device or other display device suitable for creating graphic images and alpha-numeric characters recognizable to a user. Optional cursor control device 716 allows the computer user to dynamically signal the movement of a visible symbol (cursor) on a display screen of display device 718. Many implementations of cursor control device 716 are known in the art including a trackball, mouse, touch pad, joystick or special keys on alpha-numeric input device 714 capable of signaling movement of a given direction or manner of displacement. Alternatively, it will be appreciated that a cursor can be directed and/or activated via input from alpha-numeric input device 714 using special keys and key sequence commands.

System 700 is also well suited to having a cursor directed by other means such as, for example, voice commands. System 700 also includes an I/O device 720 for coupling system 700 with external entities. For example, in one embodiment, I/O device 720 is a modem for enabling wired or wireless communications between system 700 and an external network such as, but not limited to, the Internet. A more detailed discussion of the present technology is found below.

Referring still to FIG. 7, various other components are depicted for system 700. Specifically, when present, an operating system 722, applications 724, modules 726, and data 728 are shown as typically residing in one or some combination of computer usable volatile memory 708, e.g. random access memory (RAM), and data storage unit 712. However, it is appreciated that in some embodiments, operating system 722 may be stored in other locations such as on a network or on a flash drive; and that further, operating system 722 may be accessed from a remote location via, for example, a coupling to the internet. In one embodiment, the present technology, for example, is stored as an application 724 or module 726 in memory locations within RAM 708 and memory areas within data storage unit 712. The present technology may be applied to one or more elements of described system 700.

System 700 also includes one or more signal generating and receiving device(s) 730 coupled with bus 704 for enabling system 700 to interface with other electronic devices and computer systems. Signal generating and receiving device(s) 730 of the present embodiment may include wired serial adaptors, modems, and network adaptors, wireless modems, and wireless network adaptors, and other such communication technology. The signal generating and receiving device(s) 730 may work in conjunction with one or more communication interface(s) 732 for coupling information to and/or from system 700. Communication interface 732 may include a serial port, parallel port, Universal Serial Bus (USB), Ethernet port, antenna, or other input/output interface. Communication interface 732 may physically, electrically, optically, or wirelessly (e.g. via radio frequency) couple system 700 with another device, such as a cellular telephone, radio, or computer system.

The computing system 700 is only one example of a suitable computing environment and is not intended to suggest any limitation as to the scope of use or functionality of the present technology. Neither should the computing environment 700 be interpreted as having any dependency or requirement relating to any one or combination of components illustrated in the example computing system 700.

The present technology may be described in the general context of computer-executable instructions, such as program modules, being executed by a computer. Generally, program modules include routines, programs, objects, components, data structures, etc., that perform particular tasks or implement particular abstract data types. The present technology may also be practiced in distributed computing environments where tasks are performed by remote processing devices that are linked through a communications network. In a distributed computing environment, program modules may be located in both local and remote computer-storage media including memory-storage devices.

I claim:

1. A ground moisture determiner, wherein the ground moisture determiner comprises:

a first at least one moisture sensor coupled with a first wheel of a water conveyance system having a plurality of wheels coupled therewith, the first at least one moisture sensor configured for piercing a ground during each rotation of the first wheel and for performing a first moisture sensing as a part of the first at least one moisture sensor piercing the ground;

a second at least one moisture sensor coupled with a second wheel of the plurality of wheels of the water conveyance system, the second at least one moisture sensor configured for piercing the ground during each rotation of the second wheel and for performing a second moisture sensing as a part of the second at least one moisture sensor piercing the ground;

a moisture information converter configured to receive moisture sensing information of the first moisture sensing and the second moisture sensing and to convert the moisture sensing information into a signal indicative of a moisture content of the ground with respect to the first wheel and the second wheel; and a moisture content provider configured to provide the signal indicative of the moisture content of the ground in a user accessible format.

2. The ground moisture determiner of claim 1, wherein the plurality of wheels includes a third wheel that does not have a moisture sensor coupled with it.

3. The ground moisture determiner of claim 1 further comprising:
a first plurality of moisture sensors coupled with the first wheel, and
a second plurality of moisture sensors coupled with the second wheel.

4. The ground moisture determiner of claim 1 wherein the moisture content provider is located at a wheel selected from a group consisting of the first wheel and the second wheel.

5. The ground moisture determiner of claim 1 wherein the moisture content provider is located at a central pivot that is coupled with the water conveyance system.

6. The ground moisture determiner of claim 1 wherein the signal indicative of the moisture content of the ground is transmitted wirelessly.

7. The ground moisture determiner of claim 1 wherein the signal indicative of the moisture content of the ground is transmitted over a wire.

8. The ground moisture determiner of claim 1, wherein the signal indicative of the moisture content is provided to a field management system, and wherein the field management system utilizes the signal to perform a task selected from a group consisting of: providing a manual watering adjustment recommendation and performing an automatic watering adjustment.

9. The ground moisture determiner of claim 8, wherein the field management system utilizes the signal in conjunction with one or more data types selected from a group consisting of: crop type, field parameters, time of year, weather, and intended water content for soil to perform the task.

10. A method for determining ground moisture, the method comprising:
coupling a first at least one moisture sensor to a first wheel of a watering wheel irrigator;
coupling a second at least one moisture sensor to a second wheel of the watering wheel irrigator;
rotating the watering wheel irrigator about a central pivot;
utilizing the first at least one moisture sensor and the second at least one moisture sensor to determine moisture information comprising a moisture content of a first portion of ground proximal to the first wheel and a second portion of the ground proximal to the second wheel at different points during the rotating of the watering wheel irrigator about the central pivot; and
providing a moisture information converter that converts the moisture information into a moisture content report.

11. The method of claim 10 wherein the first at least one moisture sensor and the second at least one moisture sensor determine the moisture information upon the first at least one moisture sensor and the second at least one moisture sensor piercing the ground during each rotation of the first wheel and the second.

12. The method of claim 10 further comprising:
coupling a first plurality of moisture sensors with the first wheel, and
coupling a second plurality of moisture sensors with the second wheel.

13. The method of claim 12 further comprising:
collecting, at a moisture sensor data collector, the moisture information from the first at least one moisture sensor and the second at least one moisture sensor; and
providing the moisture information to the moisture information converter.

14. The method of claim 10 further comprising:
transmitting the moisture content with a transmitter located at one of the first wheel and the second wheel.

15. The method of claim 10 further comprising:
transmitting the moisture content with a transmitter located at the central pivot.

16. The method of claim 10 wherein the method further comprises:
transmitting the moisture content with a transmitter, wherein the moisture content is provided to a field management system, and wherein the field management system utilizes the moisture content to perform a task selected from a group consisting of: providing a manual watering adjustment recommendation and performing an automatic watering adjustment.

17. The method of claim 16, wherein the transmitting of the moisture content further comprises:
transmitting of the moisture content to the field management system that utilizes the moisture content in conjunction with one or more data types selected from a group consisting of: crop type, field parameters, time of year, weather, and intended water content for soil to perform the task.

18. A moisture sensing watering system comprising:
a central pivot proximal with a water source;
a water conveyance system coupled to the central pivot, the water conveyance system comprising:
a length of water conveying material; and
at least one nozzle coupled with the water conveyance system to distribute water received from the water conveyance system;
a plurality of wheels coupled with the water conveyance system to support the water conveyance system and allow the water conveyance system to rotate about the central pivot;
a first at least one moisture sensor coupled with a first wheel of the plurality of wheels, the first at least one moisture sensor configured for piercing a ground during each rotation of the first wheel and for performing a first moisture sensing as a part of the first at least one moisture sensor piercing the ground;
a second at least one moisture sensor coupled with a second wheel of the plurality of wheels, the second at least one moisture sensor configured for piercing the ground during each rotation of the second wheel and for performing a second moisture sensing as a part of the second at least one moisture sensor piercing the ground;
a moisture information converter configured to receive moisture sensing information of the first moisture sensing and the second moisture sensing and to convert the moisture sensing information into a signal indicative of a moisture content of the ground with respect to the first wheel and the second wheel; and
a transmitter configured to transmit the signal indicative of a moisture content of the ground in a user accessible format, wherein the signal is used to automatically control an amount of water disseminated by the moisture sensing water system.

19. The moisture sensing watering system of claim 18 wherein the first at least one moisture sensor and the second at least one moisture sensor are both configured to pierce the ground during each rotation of the first wheel and the second wheel.

20. The moisture sensing watering system of claim 18 further comprising:
a first plurality of moisture sensors coupled with the first wheel, and
a second plurality of moisture sensors coupled with the second wheel.

21. The moisture sensing watering system of claim 20 further comprising:
a moisture sensor data collector that is configured to:
collect moisture information from the first plurality of moisture sensors and the second plurality of sensors, and
provide the moisture information to the moisture information converter.

22. The moisture sensing watering system of claim 18 wherein the transmitter is located at a wheel selected from a group consisting of the first wheel and the second wheel.

23. The moisture sensing watering system of claim 18 wherein the transmitter is located proximate to the central pivot.

24. The moisture sensing watering system of claim 18 wherein the signal indicative of the moisture content is provided to a field management system, the field management system being configured to utilize the signal to perform a task selected from a group consisting of: providing a manual watering adjustment recommendation and performing an automatic watering adjustment.

25. The moisture sensing watering system of claim 24 wherein the field management system is configured to utilize the signal in conjunction with one or more data types selected from a group consisting of: crop type, field parameters, time of year, weather, and intended water content for soil to perform the task.

* * * * *